United States Patent Office 2,993,056
Patented July 18, 1961

---

2,993,056
PRODUCTION OF THE 1→6-LACTONE OF 6-HYDROXY-8-ACETOXY-OCTANOIC ACID
Augusto Segre and René Viterbo, Naples, Italy, assignors to Istituto Sieroterapico Italiano S.p.A., Milan, Italy, a company of Italy
No Drawing. Filed Feb. 27, 1957, Ser. No. 642,668
Claims priority, application Italy Aug. 31, 1956
1 Claim. (Cl. 260—343)

The present invention relates to a process to produce the 6,8-dithiol-octanoic acid, which is an intermediate product for production of the dl-6,8-thioctic acid (or alpha-lipoic acid; 6,8-dithio-octanoic acid; 6,8-dithio-caprylic acid), a co-enzymatic and catalytic factor of several biochemical processes. The thioctic acid is obtained by oxidizing the 6,8-dithiol-octanoic acid, as is well known in the art.

The preparation of the 6,8-dithiol-octanoic acid is therefore an important step in the production of thioctic acid. Now, the applicants have found that it is possible to obtain with good yields this intermediate product for the production of thioctic acid, starting from the 2-(cyclohexanone-2)-acetic acid, or its esters, by a set of reactions which will be described hereinafter and which form, either jointly or severally, the object of the present invention. By way of example, as starting product, will be assumed the ethyl ester of the 2-(cyclohexanone-2)-acetic acid, but it is understood that the invention equally applies to both the free acid and all of its esters.

According to this invention, the ethyl ester of the 2-(cyclohexanone-2)-acetic acid (I) is condensed, in presence of a strong acid, with ethylene glycol (II) and, by loss of a molecule of water, yields the ethylene-acetal of the ethyl ester of the 2-(cyclohexanone-2)-acetic acid (III):

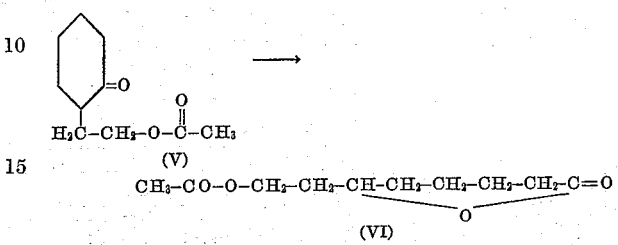

This product (III) is reduced to the ethylene-acetal of 2-(cyclohexanone-2)-ethanol (IV; R=H) by lithium aluminum hydride, or by sodium and ethanol.

The presence of the alcoholic group (hydroxy) in the compound (IV) is demonstrated by the easy preparation of the related acetate (IV; R=—OC—CH₃). The ethylene-acetal group can be easily cleaved, regenerating the ketone. In fact, both the free alcohol (IV; R=H), and its acetate (IV; R=—OC—CH₃) quickly form the respective 2,4-dinitrophenylhydrazones, thus demonstrating the easy formation of the ketone group in an acidic medium.

The acetate (IV; R=—OC—CH₃) refluxed in presence of a strong acid, forms the 2-(cyclohexanone-2)-ethanol acetate (V):

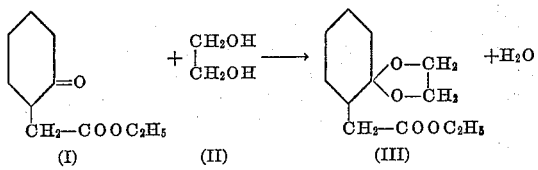

which in turn yields a 2,4-dinitrophenylhydrazone identical to that obtained starting from the acetal (IV; R=—OC—CH₃)

The ketone (V) in presence of a peracid absorbs one atom of oxygen (=two oxygen equivalents) forming the 1→6-lactone of 6-hydroxy-8-acetoxy-octanoic acid (VI).

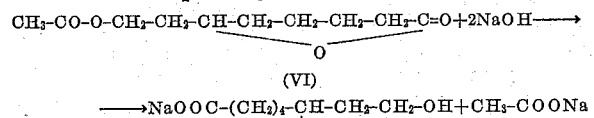

This lactone has now a chain with the carbon atoms necessary to obtain the thioctic acid, with two hydroxyl functions instead of the two sulfurated functions which are subsequently introduced. The lactone nature of this compound is demonstrated in that it used up two alkali equivalents (while the starting ketone (V) uses up only one alkali equivalent) corresponding to two carboxyl functions of the acetic residue and of the 6,8-dihydroxy-octanoic acid respectively:

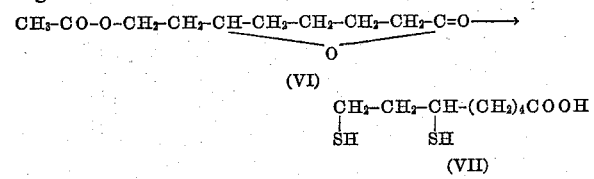

The acetate-lactone (VI), with hydriodic acid or other strong mineral acid and thiourea, and by subsequent heating with alkali forms the 6,8-dithiol-octanoic acid (VII):

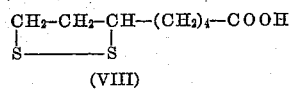

$$CH_2-CH_2-CH-(CH_2)_4COOH$$
$$\quad\quad\quad\quad\quad\quad|\quad\quad\quad|$$
$$\quad\quad\quad\quad\quad\quad SH\quad\quad SH$$

(VII)

from which, by oxidation the dl-6,8-thioctic acid is readily obtained (VIII).

$$CH_2-CH_2-CH-(CH_2)_4-COOH$$
$$\quad|\quad\quad\quad\quad\quad\quad|$$
$$\quad S\!\!-\!\!-\!\!-\!\!-\!\!-\!\!-S$$

(VIII)

which is identified by melting point, ultraviolet spectrum, melting point in admixture with an authentic sample of thioctic acid, prepared by another already well known method, and melting point of its benzyl-iso-thiouronium salt.

*Example*

(1) PREPARATION OF THE ETHYLENE-ACETAL OF THE ETHYL ESTER OF THE 2-(CYCLOHEXANONE-2)-ACETIC ACID (III)

38.5 g. of the ethyl ester of 2-(cyclohexanone-2)-acetic acid (I) (boiling point 131–134° C./14 mm. Hg; $n_D^{23°}=1.4564$; 2,4-dinitrophenylhydrazone, melting point 126° C.) are refluxed with 14.5 g. of ethylene glycol (II) and 100 cc. of toluene and a little p-toluene-sulphonic acid, continuously withdrawing the water as it is formed (4.5 cc. total) over about 3 hours. The cooled toluene solution is washed with a saturated solution of aqueous sodium bicarbonate. The toluene is evaporated and the residue is distilled under reduced pressure collecting the fraction B.P. 147° C./14 mm. Hg; $n_D^{23°}$=1.4630; yield 32.8 g.

(2) PREPARATION OF THE ETHYLENE-ACETAL OF THE 2-(CYCLOHEXANONE-2)-ETHANOL (IV; R=H)

(a) Starting from the ethylene-acetal of the ethyl ester of the 2-(cyclohexanone-2)-acetic acid, with lithium aluminum hydride:

32 g. of ethylene-acetal of the ethyl ester of the 2-(cyclohexanone-2)-acetic acid (III) are dissolved into 300 cc. of anhydrous ethyl ether. This solution is dropped into a suspension of 4 g. of lithium-aluminum hydride in 350 cc. of anhydrous ethyl ether.

After all the ester solution (III) has been added boiling is continued during one hour. After cooling and destruction of the lithium-aluminum hydride excess, the ether solution is washed successively with diluted hydrochloric acid, with a saturated solution of sodium bicarbonate and finally with water to neutrality. The solvent is evaporated and the residue is distilled under reduced pressure. 19.1 g. of the ethylene-acetal of the 2-(cyclohexanone-2)-ethanol are collected (IV; R=H), B.P. 148–150° C./13 mm. Hg; $n_D^{23°}$=1.4822. *Analysis.*—Calculated for $C_{10}H_{18}O_3$: C, 64.50%; H, 9.74%. Found: C, 64.59%; H, 9.90%. By reaction with 2,4-dinitro-phenyl-hydrazine the 2,4-dinitrophenyl-hydrazone of the corresponding ketone, M.P. 145–146° C. is obtained.

(b) By reduction by sodium metal and ethanol:

5 g. of ethylene-acetal of the ethyl ester of the 2-(cyclohexanone-2)-acetic acid (III) dissolved into 25 cc. of absolute ethanol are refluxed. Over a period of 30 minutes 5 g. of sodium are added. After refluxing for a short period, the mixture is cooled and extracted with ethyl ether, the ether layer washed with water to neutrality and the solvent is evaporated. The residue is distilled under reduced pressure, collecting 3.5 g. of product, B.P. 150–152° C./13 mm. Hg; $n_D^{23°}$=1.4825. *Analysis.*—Calculated for $C_{10}H_{18}O_3$: C, 64.50%; H, 9.74%. Found: C, 64.74%; H, 9.45%. 2,4-dinitro-phenyl-hydrazone identical to the preceding one, M.P. 145–146° C.

(3) PREPARATION OF THE ETHYLENE-ACETAL OF THE 1-ACETOXY-2-(CYCLOHEXANONE-2)-ETHANE (IV; R=CO—CH₃)

14 g. of ethylene-acetal of 2-(cyclohexanone-2)-ethanol (IV; R=H) are dissolved into 42 cc. of anhydrous pyridine, are cooled to 0° C. and 14 g. of acetic anhydride added. The mixture is left at room temperature, then ether extracted and the ether solution is washed successively with diluted hydrochloric acid, with a saturated sodium bicarbonate solution, then with water to neutrality; the solvent is evaporated. The residue is distilled under vacuum collecting 14.9 g. of product, B.P. 152° C./13 mm. Hg; $n_D^{27°}$=1.4632. *Analysis.*—Calculated for $C_{12}H_{20}O_4$: C, 63.13%; H, 8.83%. Found: C, 63.15%; H, 9.13%. With 2,4-dinitrophenylhydrazine, the relative 2,4-dinitro-phenyl-hydrazone is obtained, M.P. 109–111° C. *Analysis.*—Calculated for $C_{16}H_{20}O_6N_4$: C, 52.74%; H, 5.53%. Found: C, 52.79%; H, 5.46%.

(4) PREPARATION OF 1-ACETOXY-2-(CYCLOHEXANONE-2)-ETHANE (V)

14 g. of ethylene-acetal of 1-acetoxy-2-(cyclohexanone-2)-ethane (IV; R=CO—CH₃) are dissolved into 140 cc. of acetone and boiled with a little p-toluene-sulphonic acid. The solvent is evaporated, the residue is extracted with ethyl ether, the extract is stirred successively with a saturated solution of sodium bicarbonate and water and the ether is evaporated. The residue is distilled under vacuum collecting a fraction of 10.8 gr. of product having a B.P. 142–146° C./15 mm. Hg; $n_D^{27°}$=1.4565; ultraviolet spectrum with log E=1.8 at 2700–2750 A. (ketone band). 2,4-dinitrophenyl-hydrazone, M.P. 109–111° C. *Analysis.*—Calculated for $C_{16}H_{20}O_6N_4$: C, 52.74%; H, 5.46%. Found: C, 52.50%; H, 5.64%.

(5) PREPARATION OF 1→6-LACTONE OF THE 6-HYDROXY-8-ACETOXY-OCTANOIC ACID (VI)

10.8 g. of 1-acetoxy-2-(cyclohexanone-2)-ethane (V) are dissolved into glacial acetic acid and reacted with two equivalents of peracetic acid (=1 atom of active oxygen). The reaction product is left at room temperature, then is extracted with chloroform, is stirred successively with a saturated solution of sodium bicarbonate and water, to neutrality, and the solvent is evaporated. The residue is distilled under reduced pressure collecting 7.5 g. of product, B.P. 126–130° C./0.5 mm. Hg; $n_D^{27°}$=1.4595. Saponification: 50 mg. used up 33 mg. of potassium hydrate (theoretical value: 28 mg. of KOH). A parallel saponification of 50 mg. of the ketone acetate (V) used up 17 mg. KOH (theoretical value: 14 mg.). *Analysis.*—Calculated for $C_{10}H_{16}O_4$: C, 59.98%; H, 8.05%. Found: C, 60.64%; H, 8.44%.

(6) PREPARATION OF THE 6,8-DITHIOL-OCTANOIC ACID (VII)

2.2 g. of 1→6-lactone of the 6-hydroxy-8-acetoxy-octanoic acid (VI) are reacted with 6.5 g. of thiourea and 8.0 cc. of a concentrated strong inorganic acid, and then refluxed for 36 hours. After cooling, 30 cc. of a 30% aqueous solution of potassium hydroxide are added. After cooling the mixture is acidified and extracted with chloroform. After evaporation of the solvent, the residue is distilled under reduced pressure. Yield: 1.02 g., B.P. 180° C. (bath temperature), 1.5 mm. Hg, $n_D^{22°}$=1.5228. *Analysis.*—Calculated for $C_8H_{16}O_2S_2$: C, 46.12%; H, 7.74%. Found: C, 46.37%; H, 7.74%. By oxidation 0.8 g. of dl-6,8-thioctic acid (VIII) are obtained, M.P. 62° C. A mixed melting point of the so obtained acid with a sample of authentic 6,8-thioctic acid prepared by an already known method, shows no depression. The characteristic ultraviolet spectrum shows a maximum at 3330 A. with E=167 (ethanol). In alkaline solution, the benzyl-iso-thiouronium salt is obtained, with a melting point identical to that obtained from another dl-6,8-thioctic acid, prepared by an already known method.

We claim:

The process for preparing the 1→6-lactone of 6-hydroxy-8-acetoxy-octanoic acid which comprises: (1) condensing the ethyl ester of the 2-(cyclohexanone-2)-acetic acid in the presence of a strong acid with ethylene glycol, whereby the ethylene-acetal of the ethyl ester of the 2-(cyclohexanone-2)-acetic acid is formed; (2) dissolving the ethylene-acetal of the ethyl ester of the 2-(cyclohexanone-2)-acetic acid in absolute ethanol and refluxing the resulting solution; (3) adding sodium metal and then refluxing; (4) recovering the ethylene-acetal of 2-(cyclohexanone-2)-ethanol; (5) dissolving the ethylene acetal of 2-(cyclohexanone-2)-ethanol in anhydrous pyridine; (6) cooling the resulting solution; (7) adding acetic anhydride to said solution; (8) extracting with ether; (9) washing the ether solution successively with dilute hydrochloric acid, with a saturated sodium bicarbonate solution and with water to neutrality; (10) recovering the ethylene-acetal of 1-acetoxy-2-(cyclohexanone-2)-ethane; (11) dissolving the ethylene-acetal of 1-acetoxy-2-(cyclohexanone-2)-ethane in acetone; (12) boiling the resulting solution with p-toluene-sulphonic acid; (13) recovering 1-acetoxy-2-(cyclohexanone-2)-ethane; (14) dissolving 1-acetoxy-2-(cyclohexanone-2)-ethane in glacial acetic acid; (15) reacting the resulting solution with two equivalents of peracetic acid; and (16) recovering 1→6-lactone of the 6-hydroxy-8-acetoxy-octanoic acid.

(References on following page)

References Cited in the file of this patent

UNITED STATES PATENTS

| | | |
|---|---|---|
| 1,799,536 | Ruzicka | Apr. 7, 1931 |
| 2,331,329 | Kyrides | Oct. 12, 1943 |
| 2,549,520 | Prichard | Apr. 17, 1951 |
| 2,722,532 | Arth et al. | Nov. 1, 1955 |

OTHER REFERENCES

Baeyer et al.: Berichte, vol. 32, pp. 3625–3630, 1899.

Beilstein: Hand. der org. chem., vol. X, pp. 601 and 613, 1927.

Beilstein: Hand. der org. chem., vol. 8, sec. supp., p. 7, 1948.

Krajkeman: Manufacturing Chemist, vol. XXII, 4, April 1951, pp. 147–152.

Wagner et al.: Synthetic Organic Chemistry, John Wiley & Sons, Inc., New York, 1953, p. 155.

Bullock: J. Am. Chem. Soc., vol. 76, pp. 1828–1832, Apr. 5, 1954.

Fieser et al.: Organic Chemistry, Reinhold Publishing Co., New York, 1956, pp. 215, 124 and 188.